Figure 1:
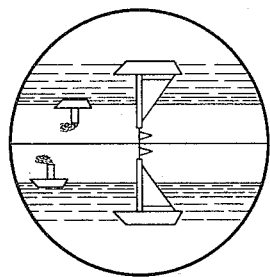

O. EPPENSTEIN.
STEREOSCOPIC TELEMETER.
APPLICATION FILED MAY 22, 1913.

1,148,222.

Patented July 27, 1915.

Witnesses:
Paul Krüger
Fritz Sander

Inventor:
Otto Eppenstein

UNITED STATES PATENT OFFICE.

OTTO EPPENSTEIN, OF JENA, GERMANY, ASSIGNOR TO THE FIRM OF CARL ZEISS, OF JENA, GERMANY.

STEREOSCOPIC TELEMETER.

1,148,222.      Specification of Letters Patent.      Patented July 27, 1915.

Application filed May 22, 1913. Serial No. 769,275.

*To all whom it may concern:*

Be it known that I, OTTO EPPENSTEIN, a citizen of the German Empire, residing at Jena, Germany, have invented a new and useful Stereoscopic Telemeter, of which the following is a specification.

The present invention relates to a stereoscopic telemeter of the kind known from the German patent specification 162471. In such a telemeter an orthostereoscopic and a pseudostereoscopic spatial image are presented to the observer simultaneously but separated from one another, the measuring device acting on the difference between the distance apart of points belonging together in the orthostereoscopic image-pair and the distance apart of the corresponding points of the pseudostereoscopic image-pair. A difference between the said distances appears, as is well known, during stereoscopic observation as a difference between the apparent distance of the object, the range of which is to be found, in the orthostereoscopic spatial image and that in the pseudo stereoscopic one. The measurement is effected, by the said object being brought, through the actuation of the measuring device, into the same apparent distance in both spatial images. When judging the apparent distance in the pseudostereoscopic spatial image of the object, the range of which is to be found, the reversion obtaining in the sequence of the image-elements in the depth direction is felt, when the form of the object is known to the observer, as an inconvenience by him, because such a reversion is not in keeping with the sequence he expects. According to the invention this inconvenience is lessened by the pseudostereoscopic spatial image being presented upside down, so that the influence of the known form of the said object is weakened by the unusual position given to it. When the two inverted images occupy only a small part of their image-field, *e. g.* only a narrow band or a bounded part within the image-field, the aforesaid inconvenience is still further reduced. When it is not desired to fit a separate objective lens for each of the four single images, from which in a well-known manner, *e. g.* by means of two separating prism systems, the two double images presented to the observer are obtained, the two ray pencil systems coming from two objective lenses may each be split by well-known means into two systems, so that each objective lens will form two single images. In order to facilitate measurement, in each double image the single images may, as is well known, be so adjusted with regard to the position as to height they occupy relatively to one another as to be contiguous to one another in a line of coincidence, which is parallel to the base-line. The two double images may be obtained with but one separating prism system, when in them the single images each occupy an undivided image-field, *i. e.* neither of them is divided by the other into two separate parts, and are contiguous to one another in a line of coincidence, which reaches across the entire image-field. When the double images are so constituted, two usable double images may be obtained, by a mixed ray pencil system, which emerges from a separating prism system, being split into two systems and by each system being transmitted to an ocular in such a manner that in the two double images presented to the observer both the two lower and the two upper single images, as is requisite for stereoscopic observation, belong to different ends of the base-line.

Figure 2:
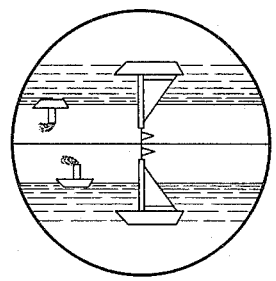
Figure 3:
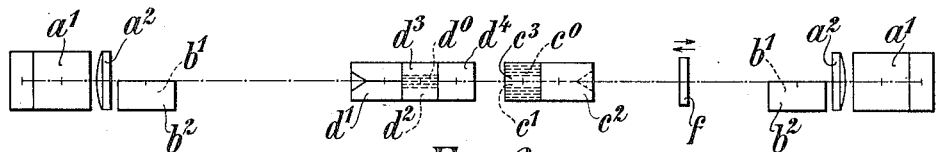
Figure 4:
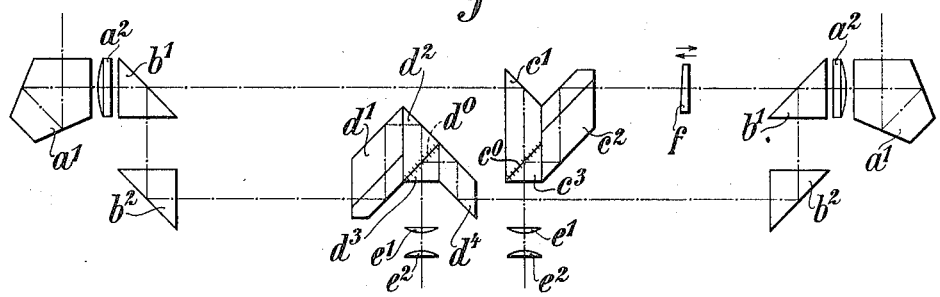
Figure 5:
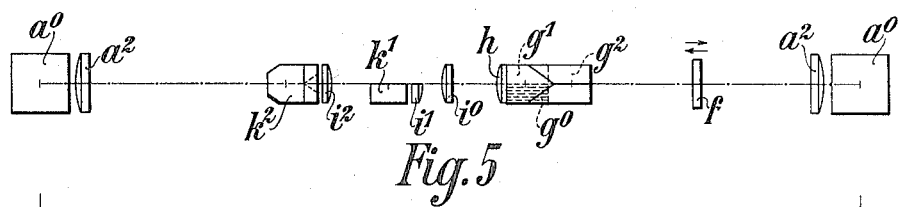
Figure 6:
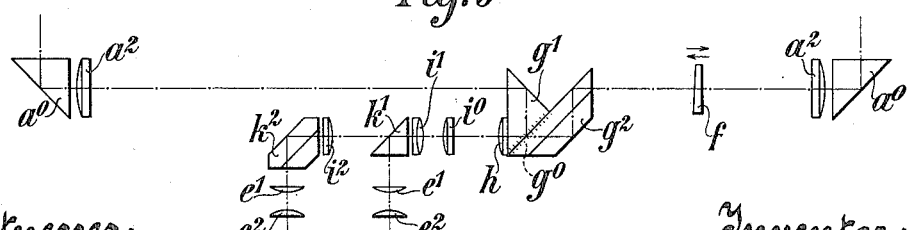

In the annexed drawing: Figures 1 and 2 show by way of example the two image-fields of a telemeter according to the invention. Figs. 3 and 4 are diagrammatic views in elevation and plan respectively of the optical parts of a telemeter constructed according to the present invention, the oculars being omitted in Fig. 3. Figs. 5 and 6 are similar views of another form of such a telemeter, the oculars being omitted in Fig. 5.

In the double images, Figs. 1 and 2, the single images each occupy an undivided image-field and are contiguous to one another in a line of coincidence parallel to the base-line and stretching across the entire image-field. In both double images coincidence obtains for the sailing boat situated in the foreground. Hence the distance apart of points belonging together of the two lower images of the sailing boat is equal to that of the corresponding points of the upper images. The distance apart of points belonging together of the two lower images of a steamer, which is more in the background, is greater than the distance apart of the corresponding points of its two upper images. Hence on the double images being observed stereoscopically the lower spatial image would be the orthostereoscopic one and the upper spatial image the pseudostereoscopic one and the sailing boat would lie in both spatial images at the same apparent distance, while the apparent distance of the steamer in the lower spatial image would be greater than that in the upper one. The range of the sailing boat, therefore, would have been found.

In the telemeter, Figs. 3 and 4, the inverted images each occupy only a band stretching in the direction of the base-line across the image-field. Behind the two objective systems $a^1$, $a^2$ two reflecting prisms $b^1$ are disposed, which are only half as high as the objective prisms $a^1$. Hence two ray pencil systems emerging from the objective systems each pass as to one half over the prisms $b^1$ and enter the right-hand separating prism system $c^1$, $c^2$, $c^3$, while they are transmitted as to their other half by means of the reflecting prisms $b^1$ and two further reflecting prisms $b^2$ to the left-hand separating prism system $d^1$, $d^2$, $d^3$, $d^4$. The cement layer $c^0$ between the prisms $c^1$ and $c^3$ is replaced all but a median, horizontal band by a separating layer reflecting on both sides, while the cement layer $d^0$ lying between the prisms $d^2$ and $d^3$ is replaced only in the corresponding median band by a separating layer. The mixed ray pencil systems emerging perpendicularly to the base-line from the separating prism systems are transmitted to the oculars $e^1$, $e^2$. A longitudinally displaceable glass wedge $f$, through which one of the ray pencil systems coming from the right-hand end of the base-line passes, indicates the measuring device. The left-hand objective supplies to the left-hand ocular the two outer part-images and to the right-hand ocular the inner part-image; the former are erect, while the latter is inverted. The right-hand objective supplies to the left-hand ocular the inner part-image and to the right-hand ocular the two outer part-images, the former part-image being inverted and the two latter ones erect. It depends on the adjustment, whether in the double images the single images are contiguous to one another in a line of coincidence and, this being the case, which boundary line of the inverted single image is the line of coincidence.

In the double images of the telemeter, Figs. 5 and 6, the single images each occupy an undivided image-field and are contiguous to one another in a line of coincidence, which is parallel to the base-line and stretches across the entire image-field. As, moreover, the lower spatial image is the orthostereoscopic one, the division of the image-field corresponds to that shown in Figs. 1 and 2. The ray pencil systems coming from the objective systems $a^0$, $a^2$ enter a separating prism system $g^1$, $g^2$, the cement layer $g^0$ of which is replaced as to its lower half by a separating layer reflecting on both sides. The mixed ray pencil system emerging from the separating prism system in the direction of the base-line is received by a collective lens $h$. Behind this lens three lenses $i^0$, $i^1$ and $i^2$ are disposed coaxially with one another, the middle one, $i^1$, of which is a half lens. The lens $i^0$ forms with either of the other two lenses a two-membered lens systems of reversion, the lenses $i^1$ and $i^2$ being so chosen as regards their powers and distances that the images formed by the two systems have the same scale. Approximately one half of each ray pencil emerging from the lens $i^0$ is received by the half lens $i^1$, the other half being received by the lens $i^2$. The two oculars $e^1$, $e^2$ are formed as angled ocular. The reflecting prism $k^1$, which is disposed behind the half lens $i^1$, belongs to the right-hand ocular and is of the same height as the half lens, so as to receive only the ray pencils emerging from the latter, and is a simple reflecting prism; the prism $k^2$, which is disposed behind the lens $i^2$ and belongs to the left-hand ocular, is provided on its reflecting surface with a ridge. A longitudinally displaceable glass wedge $f$ disposed behind the right-hand objective system again indicates the measuring device. While in the right-hand double image the lower single image belongs to the right-hand and the upper one to the left-hand end of the base-line, in consequence of the reflection at the ridge of the prism $k^2$ the left-hand double image is reversed with regard to the right-hand one in a vertical direction, so that in the said left-hand double image the upper single image belongs to the right-hand and the lower one to the left-hand end of the base-line.

I claim:

1. In a stereoscopic telemeter adapted to present two image-pairs simultaneously but separated from one another, from one of which pairs there results an erect orthostereoscopic and from the other one an inverted pseudo-stereoscopic spatial image, two objective reflecting systems, two objective lens systems, two occulars and a measuring device adapted to act on the difference between the distance apart of points of the orthostereoscopic image-pair belonging together and the distance apart of the corresponding points of the pseudostereoscopic image-pair.

2. In a stereoscopic telemeter two objective reflecting systems, two objective lens systems each of the latter forming an image, two ocular lens systems, a separating prism system adapted to form a double image from the said images, one single image of which is erect and the other inverted, means for dividing the pencil system emerging from the said separating prism system and for presenting two double images, each consisting of an upper and a lower single image and derived from the said divided pencil system, to the said two ocular lens systems so that an erect orthostereoscopic and an inverted pseudostereoscopic spatial image results, the two upper and the two lower single images belonging to opposite ends of the instrument, and a measuring device adapted to act on the difference between the distance apart of points of the upper image-pair belonging together and the distance apart of the corresponding points of the lower image-pair.

OTTO EPPENSTEIN.

Witnesses:
 PAUL KRÜGER,
 FRITZ SANDER.

Copies of this patent may be obtained for five cents each, by addressing the "Commissioner of Patents, Washington, D. C."